July 1, 1952  J. F. SULLIVAN  2,602,036
METHOD OF MAKING TRANSILLUMINATED PLATES
Filed March 27, 1950  3 Sheets-Sheet 1
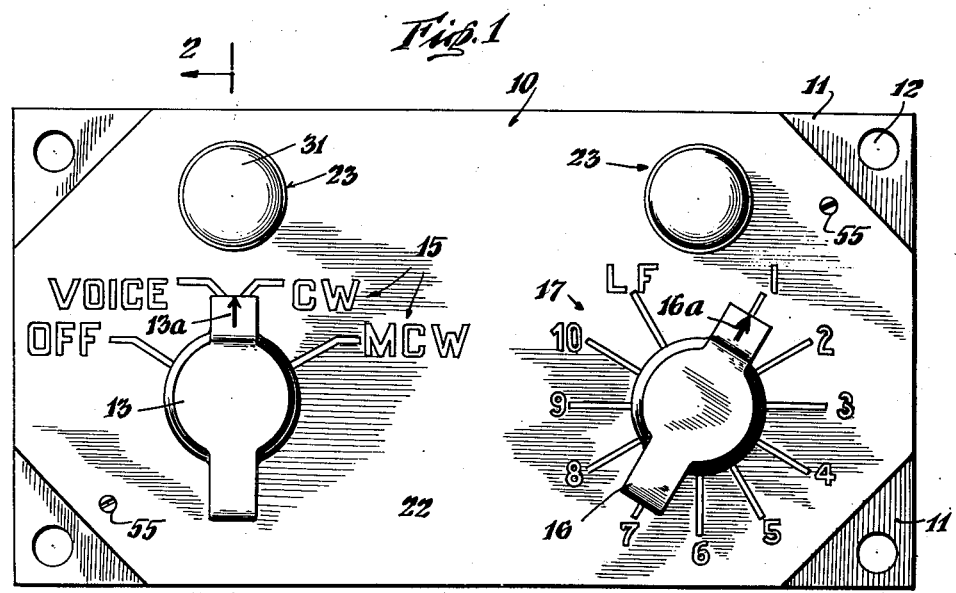
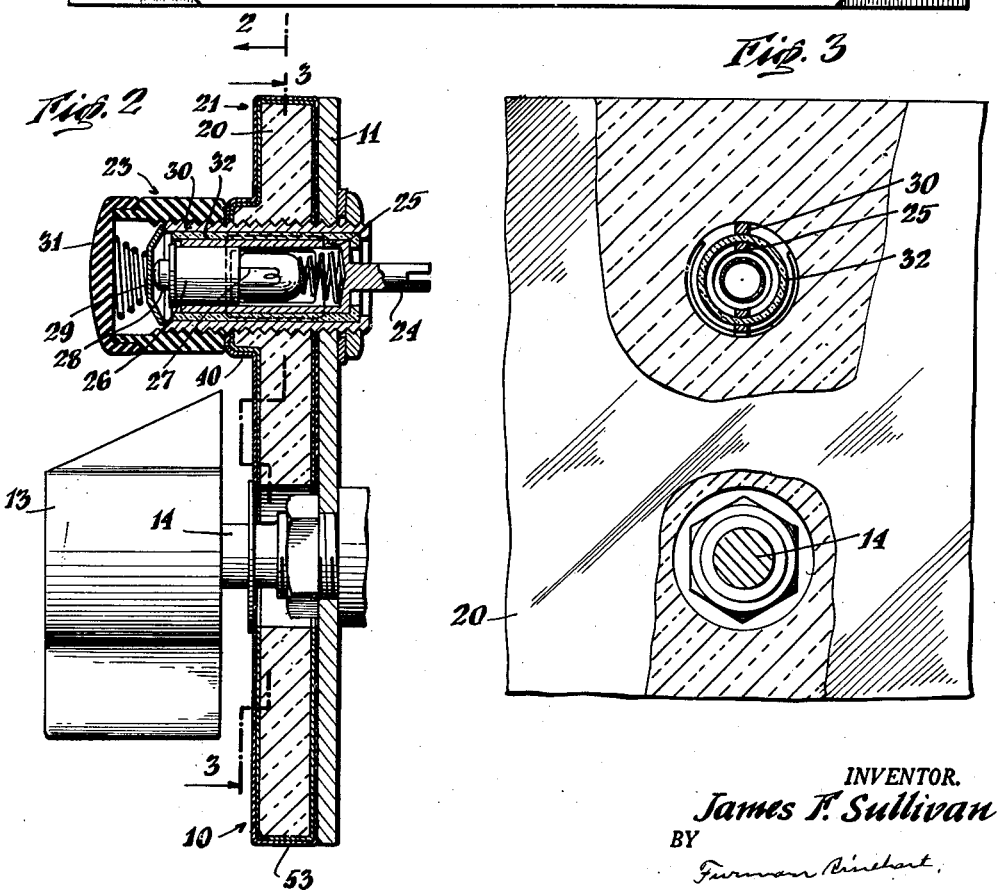
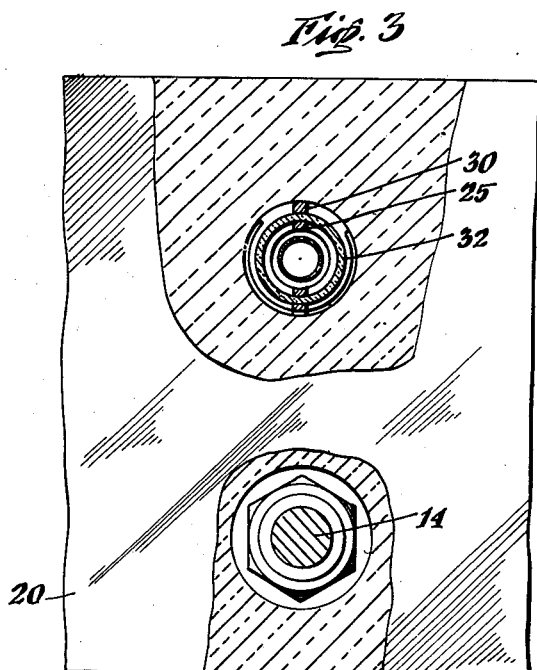
INVENTOR.
James F. Sullivan
BY
ATTORNEY

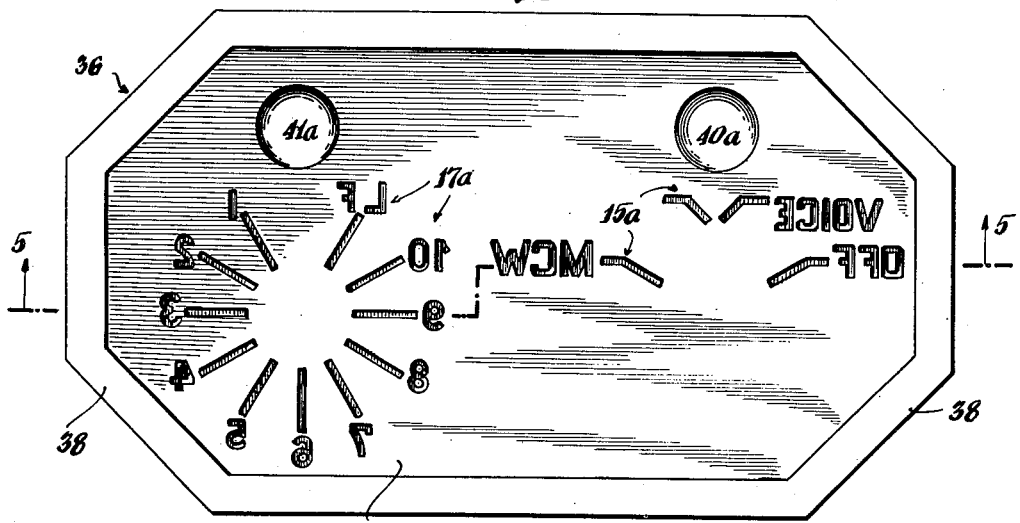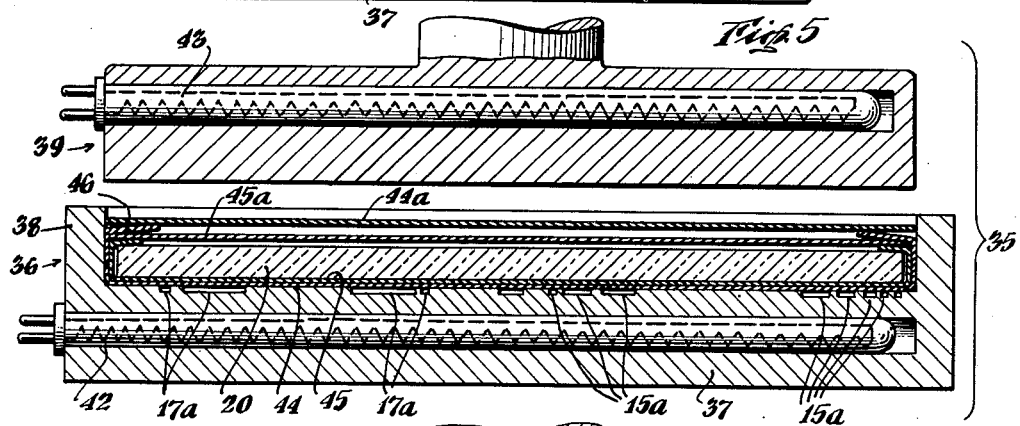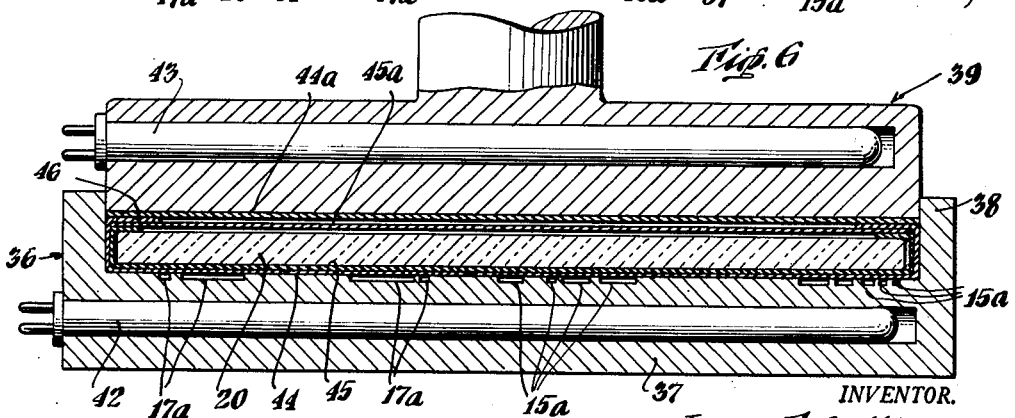

July 1, 1952  J. F. SULLIVAN  2,602,036
METHOD OF MAKING TRANSILLUMINATED PLATES
Filed March 27, 1950  3 Sheets-Sheet 3
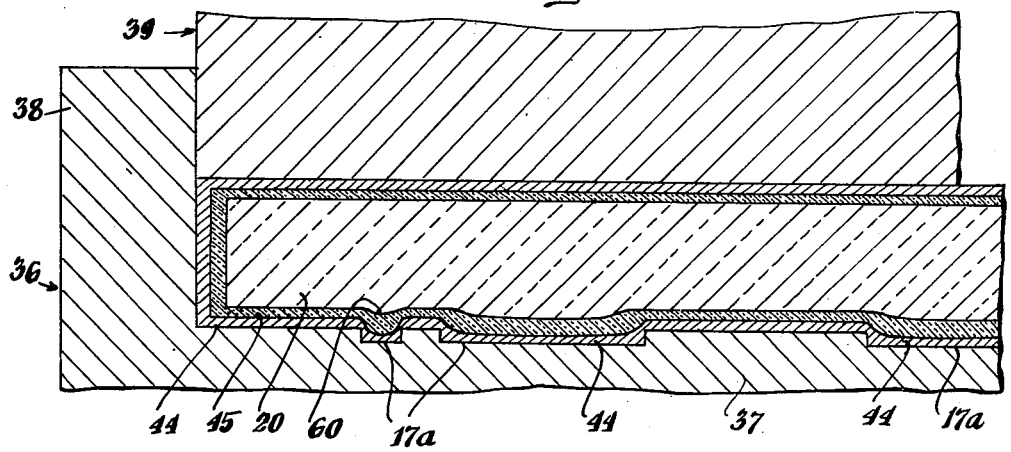
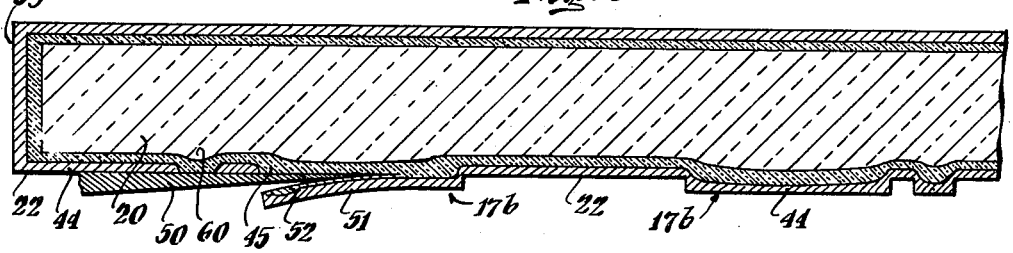
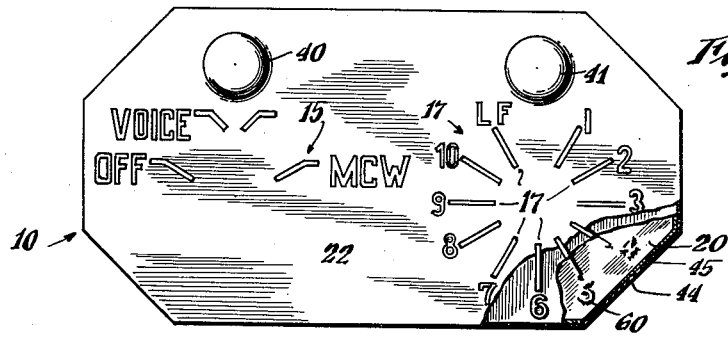
INVENTOR.
James F. Sullivan
BY
Furman Brochart
ATTORNEY Patented July 1, 1952

2,602,036

UNITED STATES PATENT OFFICE 2,602,036

METHOD OF MAKING TRANSILLUMINATED PLATES

James F. Sullivan, Jamaica, N. Y., assignor to Universal Aviation Corporation, New York, N. Y., a corporation of New York Application March 27, 1950, Serial No. 152,114

10 Claims. (Cl. 154—106)

This invention relates to light-transmitting plates having indicia visible both in the light and in the darkness, and more particularly to transilluminated panels or plates the outside surface of which, for the most part, is opaque but also has appearing thereon or therein letters, designs or other indicia of color different from and contrasting to the opaque part.

Devices of this kind are used in many fields. For example, transilluminated plates having visible indicia thereon are used on the instrument-boards or panel-boards of aeroplanes. They may be used as the dashboards of automobiles, as the dials of indicating instruments, or for radio dial panels or any type of electrical or electronic control panel. In fact, such devices find application in most, if not all, places where it is desired to indicate by means of indicia a condition which may be read in the darkness as well as in daylight or in a place otherwise lighted.

As a general rule, indicating instruments are mounted on an instrument-board or otherwise in position to be viewed by the observer seated or otherwise stationed in front of the instrument-board. In many instances the devices of the prior art, although used extensively, have drawbacks of one kind or another. For example, in the aeronautical field, light-transmitting indicating-plates are known in which a light source is provided to transilluminate a plate the surfaces of which are made in part opaque and in part translucent. The light from the light source transilluminates the plate and the translucent part which constitutes the indicia. Characters, numerals, designs, or other legible devices of contrasting color to the opaque part, can be read in daylight or in darkness since light from the light source is emitted through the translucent part or parts. Those prior art lighting plates, however, were made generally by using a plastic material such as methyl-methacrylate or equivalent polymerized derivative of methacrylate acid, which was coated with a layer of white translucent plastic material, and then this translucent layer was covered with a layer of opaque plastic material. In order to form on the surface the visible indicia, such as index marks, letters, characters or other indicia, the opaque layer was etched or engraved so as to expose the white translucent layer underneath where it was desired to expose the visible indicia. This, of course, produced a surface that was not smooth and flush, because such etched or engraved indicia were indentations in the surface. The drawback of such arrangement is that dirt or foreign matter could find its way into the indentations, become lodged there and obscure or obliterate the index or indicia. Furthermore, the white indicia, because of parallax, would not be clearly visible when observed from a wide angle; that is, from a position to the side of the plate and near the plane of its surface. Also, such etching or engraving, particularly for accurate, small and sharp letter, number or index indicia, required a manual operation or pantographic handwork not readily adaptable to mass production technique.

My invention overcomes these drawbacks, for it provides a method by which a light-transmitting plate or panel can be produced which has a flush over-all surface, opaque in part and translucent in part, the translucent part being of a color contrasting to the opaque part and in a form serving as the indicia. Not only is the flush smooth surface advantageous because of the elimination of indentations which serve as places to collect dust or foreign matter but by reason of the translucent material forming the indicia being made to extend through the opaque outer layer and its outer surface to lie flush with the surface of the opaque layer, the indicia may be read from a wider angle than raised, etched, engraved, or indented indicia.

Also, it is a common requirement that light-transmitting plates, of the kind mentioned, be light-sealed at their edges and at their rear surfaces. According to the method of this invention, this may be readily and easily done along with the steps of forming the light-transmitting plate, thereby eliminating edge sealing steps as a separate, additional operation, as has been common in prior art methods of producing light-transmitting plates. Of course there are instances which do not require that the edges or the rear of the plate be light-sealed.

According to the invention, an outer layer of opaque thermoplastic sheet material, an underlying adjacent layer of translucent thermoplastic sheet material of a contrasting color, and a body portion of transparent light-transmitting material are tenaciously bonded together under heat and pressure against a platen surface having the design of the desired indicia in intaglio, so that the unitary structure thus formed of the laminated thermoplastic material when cooled and removed from the forming surface will have those parts of the opaque and translucent layers where the design of the indicia is located, raised in cameo form above the plane of the opaque layer. That is, the design of the indicia is cameoed on the surface of the plate and is raised in relief an amount equivalent to or slightly more than the thickness of the opaque layer. The cameoed portions are then cut off or otherwise removed as by grinding or abrading down to the plane of the surface of the opaque layer so that an over-all smooth flush surface is obtained in which the design of the indicia in translucent material is exposed.

According to one method utilizing the invention for producing a light-transmitting plate, a metal mold having a side wall conforming to the configuration of the plate to be made and having an upper and lower platen is provided, the design of the indicia desired being engraved in intaglio in the surface of the lower platen serving as the bottom of the mold. Then a piece of black opaque thermoplastic sheet material larger in area than the bottom of the mold is placed in the mold with its edge portions extending upwardly. Next, a piece of white translucent thermoplastic sheet material of about the same size or slightly smaller in area is superimposed upon the opaque sheet previously laid in the mold. Then a piece of transparent light-transmitting thermoplastic material, such as methyl-methacrylate, or other suitable transparent light-transmitting material, to form the light-transmitting body portion of the finished plate, is laid in the mold superimposed on the two previously laid thermoplastic sheets. This body portion piece is much greater than the thickness of the other sheet material. When the body piece is in place the upwardly extending portions of the white and black sheets are brought up around the peripheral edge of the body piece and folded over it so that they extend over onto the upper surface of the body piece around its edges. Next a sheet of white thermoplastic is laid over the upper surface of the body portion and on top of this is laid a sheet of black opaque thermoplastic, this being of the same material as the black and white sheets first placed in the mold. The upper platen of the mold is then pressed down on the five-ply "sandwich" which is in the mold, heat and pressure being applied sufficient to cause the thermoplastic material to flow as a viscous solid into the intaglio design and at the same time the five plies are bonded together into a unitary structure. This forms a unitary structure consisting of a central body portion of transparent light-transmitting material covered by a light-tight integument consisting of the underlying layer of white translucent material and an outside layer of thin opaque material. After cooling, this unitary structure (herein for convenience of description called an "intermediate blank") is removed from the mold. The central light-transmitting body portion will be edge sealed against light transmission by the same material as its front and rear surfaces, and it will be smooth, as the heat and pressure to which it was subjected causes any wrinkles or ruffles of the thin sheet material around the edges to be smoothed out. The intermediate light-sealed blank thus formed will have the design of the indicia (formed by the intaglio design of the mold) raised in relief or protruding as a cameo above the plane of the surface surrounding the design. It may be noted here that the depth of the intaglio is predetermined so that the design of the indicia on this intermediate blank is raised above the surrounding surface a distance equivalent to or slightly more than the thickness of the opaque thermoplastic sheet material. The opaque layer over the raised design is now removed from the intermediate blank and this will expose the underlying white translucent material when the raised portion is removed down to the plane of the surrounding surface. That is, when the raised design is removed, as by cutting, grinding, or abrading, so that it lies flush with the surrounding surface of the black layer, the over-all surface is smooth and flush, and the design of the indicia in translucent material, which is in light-transmitting communication with the light-transmitting body portion, is exposed. The exposed indicia being of a color contrasting with the black opaque surrounding surface is therefore readable in the light, such as daylight, and can be read also in darkness when light rays from a suitable and properly located source are made to transilluminate the central body portion of the plate, as the light will be transmitted through the translucent indicia. Although in the foregoing description of the method of the invention the mold has been described as being engraved on the interior face of its bottom, it will be understood that the mold may be turned upside down for the molding process or the engraving of the design may be in the interior surface of the upper platen of the mold or in both of them.

It will be understood that light-transmitting plates adapted for uses in many fields may be made according to the invention. In fact, the invention may be utilized in the production of light-transmitting plates or panels for use where it is desired to have indicia which are visible either in a lighted or in a darkened place.

In the more detailed description which follows, a light-transmitting plate for the panel board of an aeroplane has been chosen for purposes of illustrating one form of device utilizing the invention, and one method for carrying out the method, but it is to be understood that the invention may be used in producing innumerable other embodiments or devices which are intended to be used in places where indicia is required or desired that can be read in darkness as well as in daylight.

Although the novel features which are believed to be characteristic of the invention will be pointed out in the annexed claims, the invention itself as to its objects and advantages and the manner in which it may be carried out may be better understood by reference to the following description taken in connection with the accompanying drawings forming a part hereof, in which:

Fig. 1 is a front view in elevation of a light-transmitting plate such as is used on an aeroplane instrument panel board;

Fig. 2 is a view in section of the device shown in Fig. 1 on line 2—2;

Fig. 3 is a view on line 3—3 of Fig. 2;

Fig. 4 is a plan view looking downward into the bottom of a metal mold in which the intermediate light-transmitting plate blank is to be formed and showing the design of the indicia in intaglio;

Fig. 5 is a view in section on line 5—5 of Fig. 4, showing the manner of placing the thermoplastic sheets and central light-transmitting body portion prior to subjecting the assembly to heat and pressure;

Fig. 6 is a view in section showing the assembly ready to form the operation, which produces the indicia in cameo form;

Fig. 7 is a partial view in cross section to larger scale of the mold an assembly illustrating how the plastic layers take the form of the intaglio and form the cameo design;

Fig. 8 is a partial view in cross section of the intermediate blank after the blank is cooled and removed from the mold and illustrating the operation of removing the raised portions of the design to form a flush surface thereby exposing the translucent layer;

Fig. 9 is a face view partly broken away of the light-transmitting plate prior to boring openings therethrough for the mounting of shafts of index knobs, light bulbs, etc., and Fig. 10 is a face view after boring the openings for the mounting of knob shafts and light bulbs such as those shown in Figs. 1 and 2.

Referring now to the drawings, in which like reference characters throughout the several views indicate like parts, Fig. 1 shows a light-transmitting plate ready for installation on an instrument panel. The light-transmitting plate 10 is mounted on an aluminum plate 11 having holes 12 for screws to attach it to a base. A rotatable index knob 13 on a shaft 14 is mounted in usual fashion on the aluminum plate 11. When the knob is rotated, the index mark 13a traverses the indicia, indicated generally by reference character 15. It will be understood that the knob shaft cooperates with switches and relays and electrical circuits not shown and not per se a part of the invention. Knob 16 is also mounted on a shaft in the same fashion as knob 13 and the index mark 16a traverses the indicia designated generally by reference character 17. It likewise is connected in known manner to the necessary electrical switches, relays and electrical circuits not shown. It will be understood that knob 13 with its index mark 13a cooperating with indicia 15 and knob 16 with its index mark 16a cooperating with indicia 17 will indicate the condition that exists when the operator views the device. The light-transmitting plate itself comprises a central light-transmitting body portion 20 enclosed in a light-tight integument 21 as described hereinafter. The indicia designs 15 and 17 are white and the surface 22 surrounding the indicia is black and opaque. Therefore, the indicia can be read in the daylight or in a lighted place. So that the indicia may be readable in darkness, suitable light source is provided which is transmitted through the transparent light-transmitting central body portion 20. Light bulbs and assemblies for this purpose are well known in the art and are illustrated by the arrangement designated generally by reference character 23.

Suffice it to say that electric current passes through post 24 through ribs 25 through sleeve 26 through the filament 27 through contact post 28 through plate 29 through slotted sleeve 30 to the grounded aluminum plate 11. Light from the incandescent filament 27 is transmitted through a red filter or screen 32 and the rays are transmitted in all directions through the transparent body portion 20. The lamp bulb is mounted between yielding compression springs and the arrangement is such that the light bulb can be removed for replacement by removing cover knob 31.

The light-transmitting indicating plate (designated generally by reference character 10 in Fig. 1) is made according to the following method. A mold 35 (see Fig. 5), the bottom of which is shown in plan view in Fig. 4, is provided. The mold comprises a bottom section 36 comprising a bottom platen 37, upstanding side walls 38, and an upper piston platen 39 fitting into the bottom section of the mold, with a snug but slidable fit. The designs of the indicia 15 and 17 (see Fig. 1) are engraved in intaglio in the surface of the bottom platen 37, the designs being indicated generally in Fig. 4 by reference characters 15a and 17a respectively. The bottom platen also is engraved at 40a and 41a (see Fig. 4) to produce bosses 40 and 41 (see Fig. 9). Both the upper section 39 and the lower section 36 of the mold are provided with heating means which as shown in the drawings are electrical resistances 42 and 43. Other suitable heating means will suggest themselves and may be provided for heating the mold.

A layer 44 of opaque thermoplastic sheet material is laid on the bottom platen 37. This sheet is large enough in area to extend upwardly along the inside of the upstanding wall 38. As shown in the drawings, this thermoplastic sheet material is vinyl chloride acetate copolymer of the order of .004 inch in thickness, it being understood, however, that the drawings are not intended to represent the parts drawn to accurate scale. However, other thermoplastic sheet material may be used, such, for example, as other resins of the vinyl group or other equivalent resins, plasticized or unplasticized, extruded, calendered or otherwise manufactured in sheet form. As shown in the drawings, the vinyl resin is plasticized with di-octyl pthalate. Although for illustrative purposes the opaque layer 44 is of the order of .004 inch in thickness, the layer may be of thicker material up to .01 inch in thickness or even thicker.

Next, a layer 45 of white translucent thermoplastic sheet material is laid on the opaque layer 44 (see Fig. 5). This sheet is slightly smaller in area than the black opaque layer 44 and as shown in the drawings is white translucent vinyl chloride acetate copolymer of the order of .01 inch in thickness. It is plasticized with the same plasticizer as the sheet 44. However, other equivalent resins may be used. Although, as shown in the drawings the translucent layer 45 is of the order of .01 inch in thickness, this layer may be thinner, say of the order of .004 inch, or it may be of greater thickness, but it should not be so thick that it will not transmit light from the transilluminated body portion 20 now to be described.

Then a piece of transparent thermoplastic light-transmitting material is placed in the mold on top of the two layers 44 and 45 of thermoplastic sheet material. This is to form the central body portion 20 of the plate when completed. As shown in the drawings, the central body portion is of the order of .187 inch in thickness and is methyl methacrylate, a thermoplastic resin well known for its optical characteristics. It is now variously known by the trade names "Plexiglas" or "Lucite." Although the central body portion as illustrated in the drawing is of the order of .187 inch in thickness, this central body portion may be of less thickness or it may be much thicker, the choice depending on different requirements, bearing in mind that its purpose is to transmit light by transillumination from a light source such as an electric lamp bulb.

The extending peripheral portions of the two layers 44 and 45 are brought up along the edge of the central body portion 20. Then a layer 45a of translucent material like layer 45 is laid on top of the central body portion 20, and finally a layer 44a of black opaque material like layer 44 is laid on top of layer 45a, all as shown in Fig. 5; it being noted that the edges are overlapped at 46 on top of the body portion 20 so that only the black opaque material is exposed.

The next step comprises bonding by means of heat and pressure, the five-ply "sandwich" consisting of the outer layers 44, 44a, the intermediate and underlying translucent layers 45, 45a and the central body portion 20, while at the same time forming the design of the indicia in raised, viz., cameo form. Fig. 6 illustrates the upper platen 39 moved into the mold in contact with the five-ply "sandwich" and prior to the time the plastic layers are soft enough to flow. The mold is heated and pressure is applied to the platen 39.

As the mold is heated and the "sandwich" put under pressure between the two platens 37 and 39, the thermoplastic layers are softened and become soft enough to flow as a viscous solid into the intaglio of the platen 37 and at the same time the various layers are fused together and become smoothed at the edges if there has been any ruffling of the material in bringing it up around the edge of the body portion 20. The intaglio or engraved indentations to form the design of the indicia are represented in Figs. 5 and 6 by reference characters 17a and 15a and in the partial section of Fig. 7 to larger scale, by reference character 17a.

A pressure of the order of 60 to 300 p. s. i. is applied and the mold heated to a temperature of the order of 220°–350° F. for a period of about ten minutes, the temperature being determined by the degree of intimacy of bond required at the interfaces of the layers of thermoplastic. A longer time could be used but ten minutes has been found to be sufficient at a temperature of about 270° F. At the end of this time the "sandwich" will take the form illustrated in Fig. 7. That is, the lower layer 44 of opaque thermoplastic and the underlying layer 45 of translucent thermoplastic will flow or otherwise find its way into the intaglio as illustrated at 17a in Fig. 7. It will be noted that at the engraved portion the black layer 44 forms at the bottom of the intaglio and the translucent layer enters in substantial conformity with the engraved trough. It is significant to note that the depth of the engraving or intaglio which is to form the raised design of the indicia represented by reference character 17b in Fig. 7 and Fig. 8, is predetermined and is made slightly deeper than the thickness of the opaque layer 44, to allow for the occlusion or compression of air within the engraved surface.

In the foregoing description the platen with the design of the indicia in intaglio has been referred to as the bottom of the mold primarily for convenience of description, for it will be understood the mold may be reversed during the pressure and heat application so that the engraved platen is the upper section or the molding may be done regardless of the position of the mold. Or the platen 39 may be the one that is engraved. Experience with the process to date indicates that it is preferable to apply heat and pressure with the engraved platen of the mold on top rather than on the bottom so that the thermoplastic sheet material must take an upward path as it is being pressed into the intaglio design. It has been found that this is advantageous as this insures sufficient flow of white plastic into the intaglio to extend above the surrounding surface when the blank is formed.

After the heating and pressure operation the mold 35 is then cooled for sufficient time to cause the thermoplastic to harden. Cooling may be accelerated by using a cooling medium such as water or by other suitable ways but cooling in the atmosphere to usual room temperature will suffice. After the five-ply assembly is cooled, it is removed from the mold as a unitary structure, the various layers of sheet thermoplastic and the central body portion having been tenaciously bonded together by the heat and pressure applied in the molding operation. The designs of the indicia will then stand out from the surrounding surface as indicated at 17b in Fig. 8. The tenacious bond between the adjacent thermoplastic layers of vinyl resin is believed to be brought about by reason of mutual solubility of the resins in the plasticizer and likewise between the central body portion 20 and the layers 45 and 45a by reason of the mutual solubility of the methyl methacrylate and the vinyl in the plasticizer of the vinyl layer. But in any event the various layers are so firmly bonded together that the assembly constituting the intermediate blank is, in effect, a unitary structure.

The intermediate blank is then processed to remove the raised portions of the design of the indicia to produce a plate that has a smooth surface, this operation removing the opaque layer overlying the design and exposing the white translucent layer that has been moved into the intaglio of the engraved platen by the heat and pressure operation above described. This step of removing the raised portions is illustrated in Fig. 8. A sharp edged tool 50 is used to cut through the protruding portions along a plane through the surface surrounding the design. Referring particularly to Fig. 8 for purposes of illustrating one method of removing the raised portions, the sharp edged tool 50 is laid on the surface 22 which is the outside surface of the opaque layer 44 and is moved with a vibratory motion through the raised black layer 51 (see Fig. 8) and since the white layer 45 at this place has been intruded into the intaglio sufficiently to extrude beyond the surface 22 a skim 52 of white material is also removed, thus exposing the design of the indicia in white translucent thermoplastic material which is in light transmitting communication with the central body portion 20 of the plate. Having removed the protruding portions of the design of the indicia along a plane at the surface 22, the design of the indicia will be exposed in white in sharp contrast to the surrounding black surface as illustrated in Fig. 9. Although this step has been described as being performed by cutting with a sharp tool, it may be performed by a grinding or abrading tool to remove the protruding portions down to the plane of the surface 22 of the plate to produce an overall smooth flush surface.

It will now be apparent that the blank illustrated in Fig. 9 comprises a central body portion 20 enclosed within a light-tight integument consisting of the black opaque thermoplastic layer 44 and the underlying white thermoplastic layer 45 bonded together and bonded to the central body portion except, of course, where the white thermoplastic is exposed at 15 and 17 which constitute the indicia. The edges of the plate will be light-sealed as illustrated at 53 in Figs. 2 and 9.

As a final step before boring the necessary holes in the light-sealed blank for mounting the light bulb assembly, knob shafts, etc., the blank may advantageously be replaced in a mold of the same dimensions as described except that the platens shall be flat and smooth and shall have no intaglio corresponding to the indicia. It is then subjected to heat and pressure so as to reduce to the general level of the surface 22 any small protrusions or irregularities, if any, remaining after the forming and cutting operations above described. This is not essential under proper production conditions but is a measure recommended as a means of insuring well bonded plastic layers and a smooth flush surface in the area of the indicia. If a matted surface is desired it may be obtained in this operation by having the platens suitably surfaced.

The blank thus formed is then bored to produce holes 40b and 41b (see Fig. 10) to accommodate the light bulb assemblies 23 (see Figs. 1 and 2); holes 13b and 16b to accommodate the assemblies for the knobs 13 and 16, and holes 54 to accommodate the mounting screws 55 to fasten the light-transmitting plate 10 to the metal plate 11.

The invention also lends itself to the production of light-transmitting plates which have transparent windows exposed at the surface. For example, if it is desired to have a transparent (as distinguished from translucent) window in the surface of the plate when completed, an intaglio in the forming platen 37 (see Fig. 4) such as illustrated at 40a is made deep enough so that in the molding operation the transparent thermoplastic of the body portion 20 is intruded into the intaglio so that it is extruded beyond the surface 22 of the plate when completed. In other words, the white translucent layer 44 and the overlying opaque layer 45 are raised above the surface 22 so that when the raised portion is cut off or removed by an operation as above described, the transparent material is exposed as a window. If desired, the window may be made to have a lens shape by forming the intaglio accordingly in the forming platen or it may be ground by lens grinding and polishing devices to shape the exposed surface of the window as a lens.

Also, if it is desired to produce translucent indicia numerals or characters which are of one color, for example, white, bounded by a border of a contrasting color, for example, red, this can be done by placing a layer of red translucent thermoplastic sheet material between the opaque layer 44 and the translucent white layer 45 at the place where the design of the indicia is located. This red layer is put in place during the assembly of the materials prior to the molding operation. In this instance, the depth of the intaglio in the platen 37 is made sufficiently deep to cause both the white layer 45 and the intermediate red layer to intrude into the intaglio a sufficient distance so that when the laminated assembly is cooled and removed from the mold both the red layer and the white layer as well as the opaque layer, where the design of the indicia is located, will extend above the surface 22 surrounding the design. Then when the thus formed cameo design of the indicia is removed down to the plane of the surface 22, the indicia will be exposed as translucent indicia in two colors. The center portion of each numeral or character will have a white center portion bounded by a red border. Other color combinations will, of course, be suggested by the foregoing description which it will be understood is illustrative.

Another significant feature accomplished by the invention is the lens effect produced by the method of forming the design of the indicia. It will be noted, as illustrated in Figs. 7 and 8, that at the places where the thermoplastic material is intruded into the intaglio forming the design of the indicia, the transparent thermoplastic material of the central body portion 20 forms a convex surface, shown by way of illustrative example at 60 in Figs. 7 and 8. This occurs as well in other letters or characters forming the indicia. The surface of the transparent body portion 20 being convex at those places, these convex portions serve in effect as lenses in transmitting light rays from the transilluminated body portion 20 to and through the white translucent portions forming the indicia. Consequently, the indicia characters are more uniformly lighted across their entire exposed areas than would be the case if the central body portion were smooth and flat at those areas.

In some instances it may be desirable to make transilluminated knobs to be used in conjunction with the transilluminated plate. It will be apparent from the foregoing description that the method of the invention may be adapted to this purpose by making the central portion of the knob of Lucite or Plexiglas and covering it with a light-tight integument having exposed translucent index marks.

The terms and expressions which have been employed herein are used as terms of description and not of limitation, and there is no intention in the use of such terms and expressions of excluding any equivalent of the features shown and described or portions thereof, but it is recognized that various modifications are possible within the scope of invention claimed.

What is claimed is:

1. Method of making a light transmitting plate having visible translucent indicia, which comprises: laminating in the order stated a slab of light transmittable thermoplastic material, a sheet of translucent reflective thermoplastic material, a sheet of opaque thermoplastic material of contrasting color and a platen the sheet-contacting surface of which is provided with recesses substantially corresponding in spacing, size and shape to the indicia desired on the end product plate, applying sufficient heat to said slab and sheets to render them flowable under compression, compressing the thus assembled slab and sheets against the recessed surface of the platen with sufficient force to flow those portions of the assembly which are juxtaposed with said recesses into cameo therein, thereafter permitting the thus modified assembly to cool, and removing the opaque portions of the cameo to uncover and expose the underlying translucent portions of such cameo.

2. Method as claimed in claim 1, wherein those portions of the slab which are juxtaposed to the recesses are flowed during the compression step into convex protuberant lens form to enhance the illumination of the overlying indicia forming portions of the translucent sheet.

3. Method as claimed in claim 1, wherein the cameo portions of the translucent sheet taper toward the base of the recesses, and wherein a sufficient part of the cameo is removed to displace the opaque portion thereof and enough of the translucent portion to give the desired appearance of boldness to the translucent indicia thus exposed to view.

4. Method as claimed in claim 1, wherein the cameo portions are removed substantially flush with the surrounding exposed surface of the opaque sheet in the finished plate to permit the translucent indicia to be seen from all angles.

5. The method of making a light transmitting plate having visible translucent indicia which comprises: enclosing a core of light transmittable thermoplastic material within a translucent light reflective thermoplastic envelope, also enclosing the core and translucent envelope within an opaque thermoplastic envelope of a color contrasting to the translucent envelope, engaging the assembled core and envelopes with a platen provided in its contacting surface with recesses substantially corresponding in spacing, size and shape to the indicia desired on the finished plate, applying sufficient heat to the assembled core and envelopes to render the thermoplastic materials thereof flowable under compression, compressing the core and envelope assembly against the recessed face of the platen with sufficient force to flow those portions of said assembly juxtaposed with the recesses into cameo therein, thereafter permitting the thus modified assembly to cool, and removing enough of the cameo to uncover and expose that part of the translucent portion of the cameo corresponding to the indicia required.

6. Method as claimed in claim 5, wherein enough of the cameo is removed to obtain maximum intensity of light through the uncovered portions of the translucent envelope without reducing the contrast between the translucent and opaque envelopes.

7. Method as claimed in claim 5, wherein a part of the thickness of the translucent portion of the cameo is also removed.

8. Method as claimed in claim 5, wherein the cameo portions of the translucent sheet taper toward the base of the recesses and wherein a sufficient part of the cameo is removed to displace the opaque portion thereof and enough of the translucent portion to give the desired appearance of boldness to the translucent indicia thus exposed to view.

9. Method as claimed in claim 5, wherein those portions of the core which are juxtaposed with the recesses are flowed during the compression step into protuberant lens form to enhance the illumination of the overlying indicia forming portions of the translucent sheet.

10. Method as claimed in claim 5, wherein the cameo portions are caused to protrude into the recesses of the platen for a distance at least as great as the thickness of the opaque envelope and less than the combined thicknesses of the opaque and translucent envelopes.

JAMES F. SULLIVAN.

REFERENCES CITED

The following references are of record in the file of this patent:

UNITED STATES PATENTS

| Number | Name | Date |
|---|---|---|
| 272,032 | Edge | Feb. 13, 1883 |
| 425,357 | Wendlinger | Apr. 8, 1890 |
| 2,095,558 | Oberacker | Oct. 12, 1937 |
| 2,128,246 | Hardesty | Aug. 30, 1938 |
| 2,184,121 | Hendriksen | Dec. 19, 1939 |
| 2,193,586 | Fischett | Mar. 12, 1940 |